United States Patent
Kim et al.

(10) Patent No.: US 10,746,449 B2
(45) Date of Patent: Aug. 18, 2020

(54) METHOD FOR CONTROLLING AIR CONDITIONER

(71) Applicant: LG ELECTRONICS INC., Seoul (KR)

(72) Inventors: Jinsung Kim, Seoul (KR); Dongryul Park, Seoul (KR); Jungwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 15/750,247

(22) PCT Filed: Aug. 4, 2016

(86) PCT No.: PCT/KR2016/008589
§ 371 (c)(1),
(2) Date: Feb. 5, 2018

(87) PCT Pub. No.: WO2017/023127
PCT Pub. Date: Feb. 9, 2017

(65) Prior Publication Data
US 2018/0231292 A1    Aug. 16, 2018

(30) Foreign Application Priority Data
Aug. 4, 2015   (KR) ................. 10-2015-0110192

(51) Int. Cl.
*F25B 49/02*   (2006.01)
*F24F 11/89*   (2018.01)
(Continued)

(52) U.S. Cl.
CPC ............ *F25B 49/022* (2013.01); *F24F 11/00* (2013.01); *F24F 11/89* (2018.01); *F25B 49/025* (2013.01);
(Continued)

(58) Field of Classification Search
CPC ....... F25B 49/022; F25B 49/025; F24F 11/89; F24F 11/00; G05B 13/042
(Continued)

(56) References Cited

U.S. PATENT DOCUMENTS

| 4,407,139 A | 10/1983 | Ide et al. |
| 4,662,185 A | 5/1987 | Kobayashi et al. |
| 2006/0266059 A1* | 11/2006 | Wetekamp ............... F25C 5/22 62/187 |

FOREIGN PATENT DOCUMENTS

| GB | 2 086 617 | 5/1982 |
| JP | S 63-187061 | 8/1988 |

(Continued)

OTHER PUBLICATIONS

European Search Report dated Feb. 15, 2019 issued in Application No. 16833363.1.
(Continued)

*Primary Examiner* — Mohammad Ali
*Assistant Examiner* — Joshua T Sanders
(74) *Attorney, Agent, or Firm* — Ked & Associates LLP

(57) ABSTRACT

A method for controlling an air conditioner and an air conditioner are provided. The air conditioner may include a compressor that compresses a refrigerant; and a control unit that controls the compressor. The control unit may include a main control unit that controls an entirety of the air conditioner; a start-up control unit that controls the compressor at an initial start-up of the compressor; a normal control unit that controls the compressor according to a target room temperature after the start-up control unit completely controls the compressor; and a bumpless control unit that calculates a compensation value for lowering an operating frequency of the compressor according to an indoor load when a priority for controlling the compressor is transferred from the start-up control unit to the normal control unit. The
(Continued)

bumpless control unit lowers the operating frequency of the compressor according to the compensation value.

8 Claims, 8 Drawing Sheets

(51) Int. Cl.
*F24F 11/00* (2018.01)
*G05B 13/04* (2006.01)
(52) U.S. Cl.
CPC ........ *G05B 13/042* (2013.01); *F25B 2500/26* (2013.01); *F25B 2600/0253* (2013.01); *F25B 2700/2104* (2013.01)
(58) Field of Classification Search
USPC .......................................................... 700/278
See application file for complete search history.

(56) References Cited

FOREIGN PATENT DOCUMENTS

| | | |
|---|---|---|
| JP | H 03-181766 | 8/1991 |
| JP | 2015-113993 | 6/2015 |
| KR | 10-1998-0086245 | 12/1998 |
| KR | 10-2005-0105744 | 11/2005 |
| KR | 10-2008-0013402 | 2/2008 |
| KR | 10-1064483 | 9/2011 |

OTHER PUBLICATIONS

International Search Report (with English Translation) and Written Opinion dated Nov. 9, 2016 issued in Application No. PCT/KR2016/008589.

\* cited by examiner

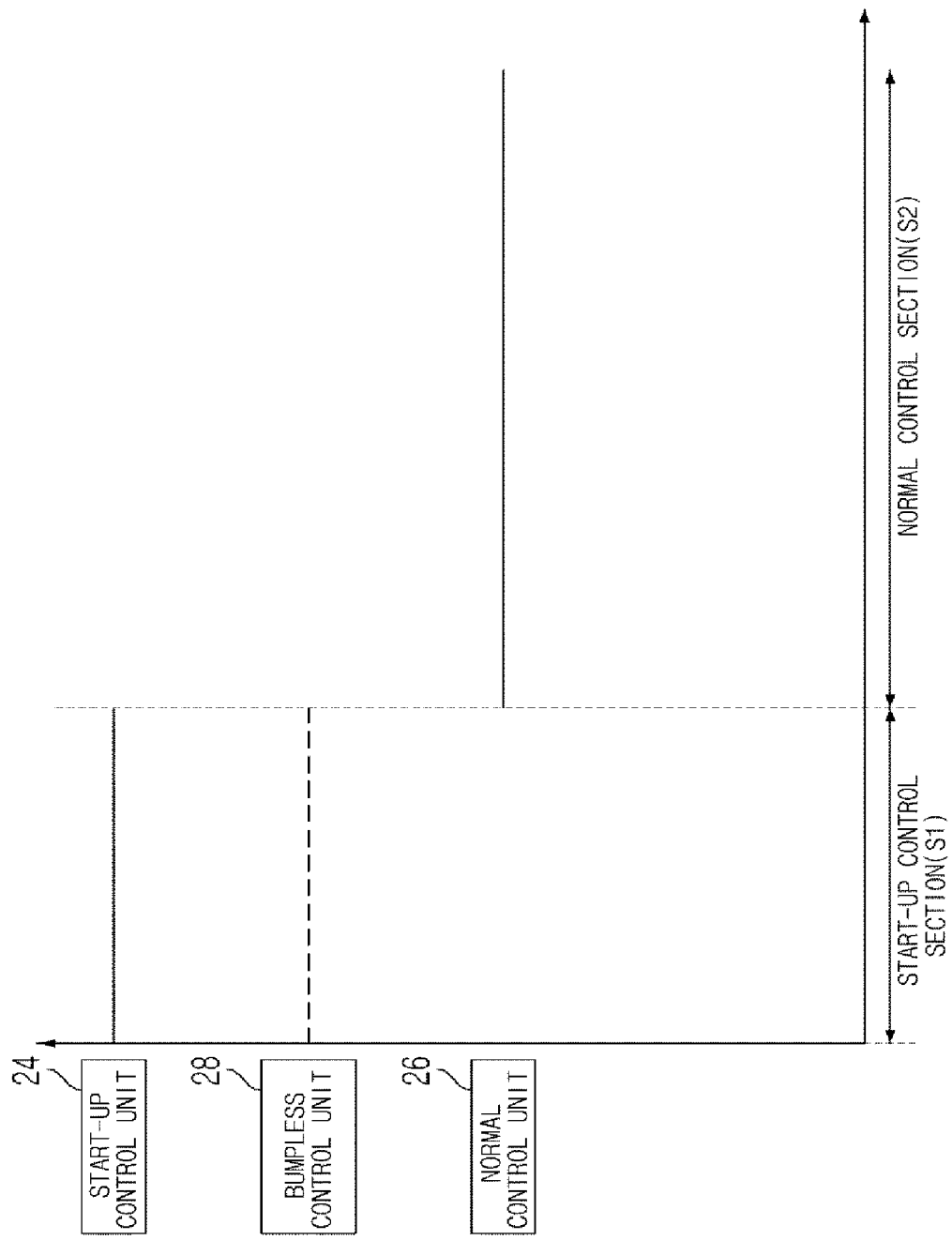

METHOD FOR CONTROLLING AIR CONDITIONER

CROSS-REFERENCE TO RELATED PATENT APPLICATIONS

This application is a U.S. National Stage Application under 35 U.S.C. § 371 of PCT Application No. PCT/KR2016/008589, filed Aug. 4, 2016, which claims priority to Korean Patent Application No. 10-2015-0110192, filed Aug. 4, 2015, whose entire disclosures are hereby incorporated by reference.

TECHNICAL FIELD

The present invention relates to a method for controlling an air conditioner, and more particularly to a method for controlling a compressor of an air conditioner.

BACKGROUND ART

In general, an air conditioner consists of a compressor, a condenser, an evaporator, and an expander, and supplies cold air or warm air into a building or a room using an air conditioning cycle.

The structure of the air conditioner is classified as a separated type in which a compressor is disposed outside, or as an integrated type in which a compressor is integrated.

In a separated-type air conditioner, an indoor heat exchanger is installed in an indoor unit, whereas an outdoor heat exchanger and a compressor are installed in an outdoor unit to be connected via a refrigerant pipe.

In the integrated-type air conditioner, an indoor heat exchanger, an outdoor heat exchanger, and a compressor are installed in the same case.

The integrated-type air conditioner is classified as a window-mounted air conditioner mounted in a device hung over a window or as a duct-mounted air conditioner mounted outside by connecting an intake duct and a discharge duct.

The separated-type air conditioner is classified as a stand-alone air conditioner or as a wall-mounted air conditioner mounted in a wall.

The air conditioner compresses a refrigerant to a target temperature.

The compressor operates in a start-up control in which compressor operates for a specific time period after application of power, and in an on-time control in which the compressor is controlled according to a target temperature after the start-up control is completed.

RELATED ART DOCUMENTS

Patent Documents

Korean Patent Application Publication No. 10-2008-0013402
Korean Patent Application Publication No. 10-2005-0105744

DISCLOSURE

Technical Problem

One object of the present invention is to provide a method for controlling a compressor of an air conditioner, the method which is able to perform a bumpless control in response to an indoor load when the compressor is switched from a start-up control to an on-time control.

Another object of the present invention is to provide a compressor of an air conditioner, which is able to perform a bumpless control in response to an indoor load when the compressor is switched from a start-up control to an on-time control.

Objects of the present invention should not be limited to the aforementioned objects and other unmentioned objects will be clearly understood by those skilled in the art from the following description.

Technical Solution

In one aspect, an air conditioner includes: a compressor configured to compress a refrigerant; and a control unit configured to control the compressor, wherein the control unit comprises: a main control unit configured to control an entire air conditioner, a start-up control unit configured to control the compressor when the operation is in operation, a normal control unit configured to control the compressor according to a room temperature unit after controlling of the start-up control unit is completed, and a bumpless control unit configured to, when a control right over the compressor is transferred from the start-up control unit to the normal control unit, apply a compensation value, which is a stepped down operating frequency of the compressor, according to an indoor load.

In another general aspect, a method for controlling an air conditioner which includes: a compressor configured to compress a refrigerant; and a control unit configured to control the compressor, wherein the control unit comprises: a main control unit configured to control an entire air conditioner, a start-up control unit configured to control the compressor when the operation is in operation, a normal control unit configured to control the compressor according to a room temperature unit after controlling of the start-up control unit is completed, and a bumpless control unit configured to, when a control right over the compressor is transferred from the start-up control unit to the normal control unit, calculate a compensation value which lowers an operating frequency of the compressor according to an indoor load, and wherein the bumpless control unit steps down the operating frequency of the compressor according to the compensation value.

The bumpless control unit may adjust a timing of applying a compensation value according to the indoor load.

The timing of applying a compensation value may be determined by comparing and a frequency (Hz_init) of the compressor at a switching timing and an accumulated control increment (Hz_sum) of the compressor, which is calculated when a normal control is performed on the compressor according to the indoor load, and, when the accumulated control increment (Hz_sum) is equal to or greater than the frequency (Hz_init) of the compressor at the switching timing, the timing of applying a compensation value may be determined.

The timing of applying a compensation value may be determined according to a control increment (HZ_del) which increases or decreases an operating frequency of the compressor when a normal control is performed on the compressor according to the indoor load, and, when the control increment (Hz_del) is equal to or smaller than "0", the timing of applying a compensation value may be determined.

The compensation value may be a difference between a frequency (Hz_init) of the compressor at a switching timing and an accumulated control increment (Hz_sum) of the compressor calculated when a normal control is performed on the compressor according to the indoor load.

The method may include: a step (S10) in which the compressor initially starts up as power is applied to the compressor; a step (S20) in which the start-up control unit performs a start-up control on the compressor upon the initial start of the compressor; a step (S30) in which a switching condition for switching a control right over the compressor is determined after the step S20; a step (S40) in which the timing of applying a compensation value is determined when the switching condition is satisfied in the step S30; a step (S50) in which a size of the compensation value is determined when the switching condition is satisfied in the step S30; a step (S60) in which the timing of applying a compensation value and the size of the compensation value respectively determined in the steps S40 and S50 are applied to the compressor (10); and a step (S70) in which the main control unit switches the control right to be transferred to the normal control unit (26) after the step S60.

The switching condition in the step S30 may be set with respect to a target room temperature.

The switching condition in the step S30 may be set with respect to an operating time of the compressor.

The switching condition in the step S30 may be set as a predetermined ratio of a difference between a target room temperature and a room temperature.

The step S40 may be determined by comparing a frequency (Hz_init) of the compressor at a switching timing and an accumulated control increment (Hz_sum) of the compressor, which is calculated when a normal control is performed on the compressor according to an indoor load.

The accumulated control increment (Hz_sum) may be equal to or greater than the frequency (Hz_init) of the compressor at the switching timing, the timing for applying a compensation value is determined.

The step S40 may be determined by a control increment (Hz_del) that increases or lowers an operating frequency of the compressor when normal control is performed on the compressor according to an indoor load.

When the control increment (Hz_del) is equal to or smaller than "0", the timing for applying a compensation value may be determined.

In the step S40, when an accumulated control increment (Hz_sum) of the compressor, which is calculated when a normal control is performed on the compressor according to an indoor load, is equal to or greater than the frequency (Hz_init) of the compressor at the switching timing, the timing of applying a compensation value may be determined, or, when a control increment (Hz_del) for increasing or decreasing an operating frequency of the compressor while a normal control is performed on the compressor according to an indoor load is equal to or smaller than "0", the timing of applying a compensation value may be determined.

The compensation value in the step S50 may be a difference between a frequency (Hz_init) of the compressor at a switching timing and an accumulated control increment (Hz_sum) of the compressor, which is calculated when normal control is performed on the compressor according to an indoor load.

Advantageous Effects

The embodiments of a method for controlling a compressor of an air conditioner according to the present invention have one or more effects as follows.

First, when a start-up control of the compressor is switched to a normal control, the present invention applies a compensation value for lowering the operating frequency of the compressor according to an indoor load, thereby reducing energy consumption of use of the compressor.

Second, when a start-up control of the compressor is switched to a normal control, the present invention applies a compensation value for lowering the operating frequency of the compressor according to an indoor load, thereby preventing occurrence of oscillation of a room temperature.

Third, when a start-up control of the compressor is switched to a normal control, the present invention applies a compensation value for lowering the operating frequency of the compressor according to an indoor load, thereby preventing the compressor from being turned off due to over-cooling upon the start-up control.

Fourth, when a start-up control of the compressor is switched to a normal control, the present invention is able to step down the operating frequency of the compressor into a different compensation value according to a size of an indoor load.

Fifth, when a start-up control of the compressor is switched to a normal control, the present invention is able to actively determine a timing of applying a compensation value according to an indoor load.

DESCRIPTION OF DRAWINGS

FIG. 4 is a graph illustrating a control right over a compressor according to the first embodiment of the present invention.

Advantages and features and a method of achieving the same will be more clearly understood from embodiments described below in detail with reference to the accompanying drawings. However, embodiments are not limited to the following embodiments and may be implemented in various different forms. The embodiments are provided merely to complete disclosure and to provide those skilled in the art with the category of the invention. The invention is defined only by the claims. Wherever possible, the same reference numbers will be used throughout the specification to refer to the same or like parts.

Hereinafter, the present invention will be described in more details with reference to the accompanying drawings.

Figure 1:
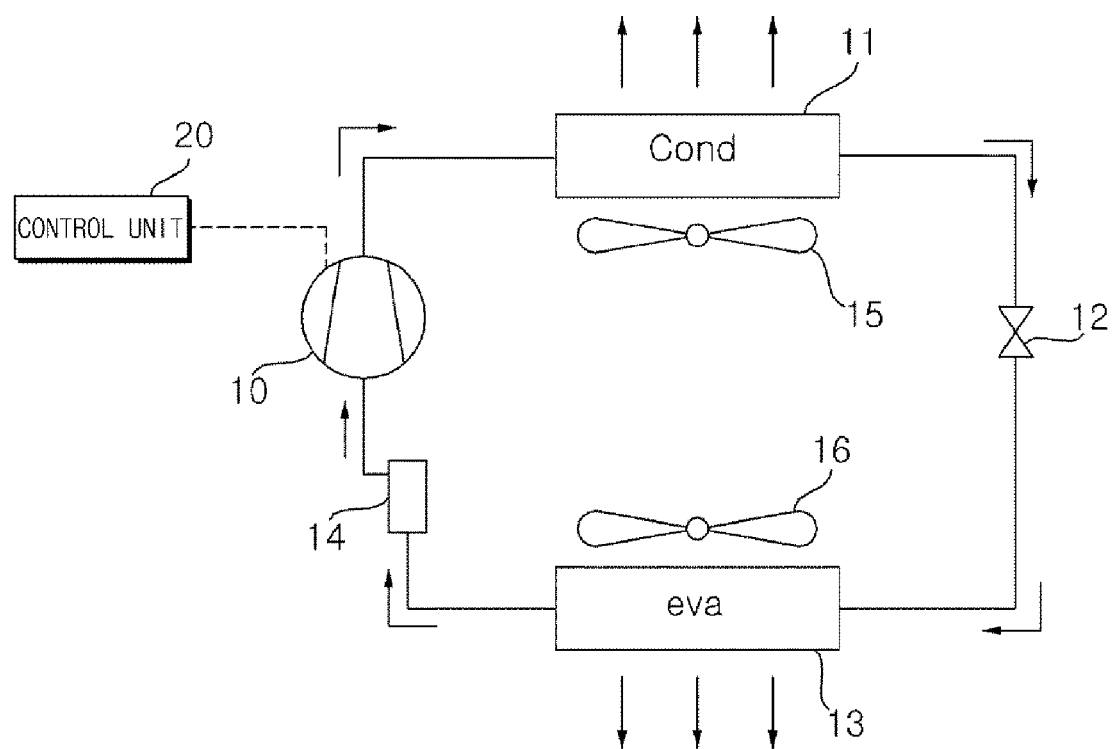
FIG. 1 is a block diagram of an air conditioner according to a first embodiment of the present invention.
Figure 2:
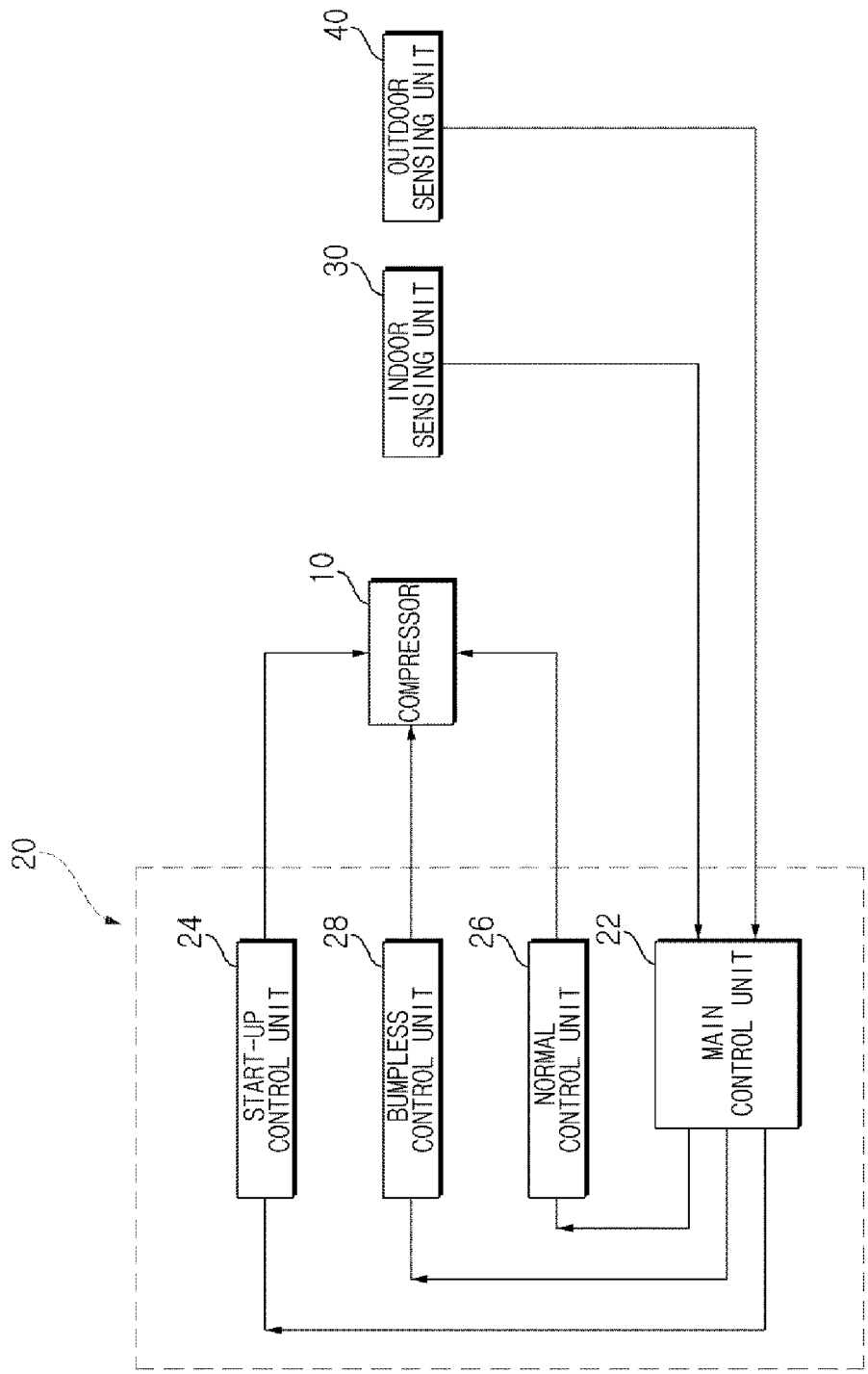
FIG. 2 is a block diagram illustrating controlling of a compressor according to the first embodiment of the present invention.
Figure 3:
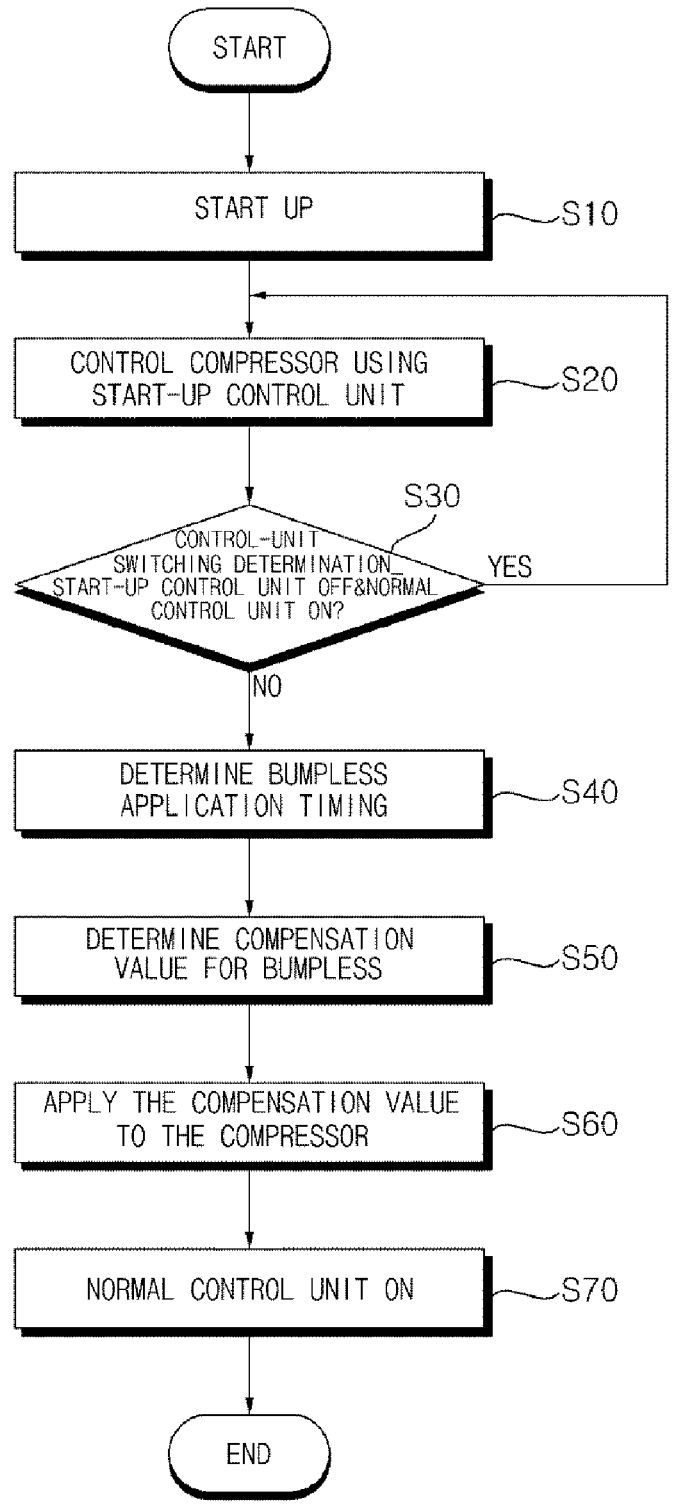
FIG. 3 is a flowchart illustrating a method for controlling a compressor according to the first embodiment of the present invention.

Referring to FIG. 1 or 4, a method for controlling a compressor of an air conditioner according to a first embodiment will be described.

The air conditioner according to this embodiment of the present invention comprises: a compressor 10 for compressing a refrigerant; a condensation heat exchanger for being supplied with the refrigerant compressed by the compressor 10 and condensing the supplied refrigerant; an expansion device 12 for expanding liquid refrigerant condensed by the condensation heat exchanger; an evaporation heat exchanger for evaporating refrigerant expanded by the expansion device 12; an accumulator 14 for being supplied with a refrigerant discharged from the evaporation heat exchanger 13 and providing only evaporated refrigerant to the compressor 10; and a control unit 20 for controlling the compressor 10.

The expansion device 12 may be any of various types, such as an electronic expansion valve (eev), a Bi-flow valve, or a capillary tube.

The air conditioner may further include; a condensation fan 15 for blowing air toward the condensation heat exchanger 11; and an evaporation fan 16 for bowing air toward the evaporation heat exchanger 13.

The method for controlling a compressor of an air conditioner according to the present invention may be applied, regardless of whether the air conditioner is an integrated type or a separate type.

The compressor may be any of various types, such as a constant-speed compressor, an inverter compressor, etc.

The air conditioner includes an indoor sensing unit 30 and an outdoor sensing unit 40 installed therein to control the compressor 10.

The control unit 20 may control the compressor 10 using temperature, humidity, refrigerant pressure sensed by the indoor sensing unit 30 or the outdoor sensing unit 40.

The indoor sensing unit 30 may include a room temperature sensor for sensing room temperature, an evaporation-heat-exchanger temperature sensor for sensing temperature in the evaporation heat exchanger, and an evaporation-refrigerant-pressure sensor for sensing refrigerant pressure in the evaporation heat exchanger.

The outdoor sensing unit 40 may include an outdoor temperature sensor for sensing outdoor temperature, a condensation-heat-exchanger temperature sensor for sensing temperature in the condensation heat exchanger, and a condensation-refrigerant-pressure sensor for sensing refrigerant pressure in the condensation heat exchanger.

The air conditioner may include a pressure sensor and a temperature sensor installed in an indoor pipe or an outdoor pipe to sense refrigerant temperature The control unit 20 includes: a main control unit 22 for controlling the entire air conditioner; a start-up control unit 24 for controlling the compressor 10 when the compressor 10 is in operation; a normal control unit 26 for controlling the compressor 10 according to a target room temperature after the start-up control unit 24 completes a control operation; and a bumpless control unit 28 for controlling a compensation value of the operational frequency of the compressor 10 according to an indoor load when a control right is transferred from the start-up control unit 24 to the normal control unit 26.

The main control unit 22 controls everything related to operation of the air conditioner. In this embodiment, the main control unit 22 received a signal sensed by the indoor sensing unit 30 or the outdoor sensing unit 40.

The main control unit 22 switches a control right so that the start-up control unit 24 or the normal control unit 26 controls the compressor 10.

When power is applied to the compressor 10, the start-up control unit 24 takes over the control right over the compressor 10 from the main control unit 22.

The start-up control unit 24 performs a start-up control. The start-up control indicates driving the compressor 10 in a preset specific pattern.

The start-up control may be a quick control for lowering room temperature quickly. A compressor frequency in the start-up control may be the maximum frequency or a frequency close to the maximum frequency.

During the initial start-up of the compressor 10, the start-up control unit 24 may operate the compressor 10 for a specific time period, regardless of a room temperature. In addition, during the initial start-up of the compressor 10, the start-up control unit 24 may operate the compressor 10 at a specific frequency for a specific time period, regardless of a room temperature.

The specific pattern is preset, and the same pattern is repeated whenever the compressor 10 initially starts up. That is, during the initial start-up of the compressor 10, a repeated specific frequency or a repeated specific pattern of the compressor 10 may be regarded as a start-up control.

During the initial start-up, the start-up control unit 24 may operate the compressor 10 in the specific pattern so as to quickly convert the compressor 10 to a normal state.

The start-up control unit 24 has a minimum operating time.

The start-up control may circulate whole refrigerants in the air conditioner quickly, and allow the air conditioner to operate as a refrigeration cycle or a heat pump cycle.

The normal control unit 26 controls the compressor 10 according to a target room temperature.

Controlling the compressor 10 by the normal control unit 26 according to a target room temperature is defined as a normal control. The normal state indicates a state in which the compressor is able to operate in response to an indoor load. In the normal state, the normal control unit 26 may control the compressor 10.

For example, in the case where there is a great load in accordance with a target room temperature, it is possible to increase an operating frequency of the compressor 10. In the case where there is a less load in accordance with a target room temperature, it is possible to decrease or turn off an operating frequency of the compressor 10.

The bumpless control unit 28 operates together with the start-up control unit 24 upon operation of the start-up control unit 24. When the start-up control 24 is in operation, the bumpless control unit 28 does not have the control right over the compressor: however, the bumpless control unit 28 operates together with the start-up control unit 24 upon operation of the start-up control unit 24 to calculate a compensation value.

When a control of the start-up control unit 24 is terminated, the main control unit 22 may switch the control right to be transferred the control right to the normal control unit 26.

When the control right is transferred from the start-up control unit 24 to the normal control unit 26, the bumpless control unit 28 calculates a compensation value for an operating frequency of the compressor 10 and provides the compensation value to the normal control unit 26.

After calculating the compensation value, the bumpless control unit 28 may control the operating frequency of the compressor 10 on its own.

The bumpless control unit 28 may control the compressor 10 by providing a compensation value to the control unit 26 or may control the operating frequency of the compressor 10 on its own. In either case, the compensation value is applied to the compressor 10 in a process of entrance to a normal control.

The compensation value is to lower the operating frequency of the compressor 10. By applying the compensation value to the compressor, it is possible to save energy consumption. As a compressor frequency during the start-up control is the maximum frequency or close thereto, the compensation value is applied to lower the operating frequency of the compressor 10.

In this embodiment, the size of the compensation value is determined according to an indoor load.

The compensation value may be calculated as "0". In the case where the compensation value is "0", start-up control and normal control are performed continuously and therefore any change in the frequency of the compressor 10 is not found.

In the case where a compensation value is not "0", the operating frequency of the compressor 10 is changed after the start-up control. If a compensation value other than "0" is applied to the compressor 10, the operating frequency of the compressor 10 is decreased by a specific amount.

In this embodiment, the compensation value adjusts the operating frequency of the compressor 10 in a step-down manner. Contrary to this embodiment, the compensation value may possibly adjust the operating frequency of the compressor 10 to have a slope.

For the sake of energy saving, it is desirable to quickly decrease the operating frequency of the compressor in a step-down manner.

The air conditioner according to an embodiment of the present invention comprises: a step S10 in which the compressor 10 initially starts up as power is applied to the compressor 10; a step S20 in which the start-up control unit 24 performs a start-up control of the compressor 10 during the initial start-up; a step S30 in which a switching condition for switching the control right over the compressor 10 is determined after the step S20; a step S40 in which a timing of applying a compensation value by the bumpless control unit 28 is determined when the switching condition is satisfied in the step S30; a step 50 in which the size of the compensation value calculated by the bumpless control unit 28 is determined when the switching condition is satisfied in the step S30; a step S60 in which the compensation value is applied to the compressor 10; and a step S70 in which the main control unit switches the control right after the step S60 to be transferred to the normal control unit 26.

The main control unit 22 applies power to the compressor 10 in the step S10.

In the step S20, the start-up control unit 22 controls the compressor 10 through a start-up control.

During the start-up control, the compressor 10 may operate in a specific pattern.

In the step S30, whether to transfer the control right from the start-up control unit 24 to the normal control unit 26 is determined. To this end, a switching condition is determined in the step S30.

The switching condition in the step S30 may be set with respect to a target room temperature. For example, a switching condition may be set to be +2° C. with respect to a target room temperature.

In contrary, a switching condition may be set with respect to an operating temperature and a target room temperature of the air conditioner. For example, it may be set to perform switching of the control right when a difference between operation temperature (e.g., 32° C.) and a target room temperature (e.g., 24° C.) reaches to a predetermined level. The predetermined level may vary, for example, 80%, 50%, etc.

The switching condition may be set with respect to an operating time. For example, it may be set to perform switching of the control right five minutes after start-up of the compressor.

The switching condition may be any one of a target room temperature, a predetermined level of the temperature difference, or time.

A bumpless application timing is determined In the step S40, and a compensation value for bumpless is determined in the step S50.

The steps S40 and S50 may be performed in sequence or at the same time.

In the step S40, a bumpless application timing may be determined by an accumulated control increment Hz_sum of an indoor load and a compressor frequency Hz_init at a switching timing.

The accumulated control increment is a value calculated by the bumpless control unit 28. The accumulated control increment is a value that is calculated when the normal control unit 26 performs a normal control on the compressor using a target room temperature and a room temperature sensed by the indoor sensing unit 30.

The bumpless control unit 28 calculates the accumulated control increment Hz_sum in a start-up control section S1. The accumulated control increment Hz_sum is not a value for actually controlling the compressor 10, but a value virtually calculated in the start-up control section S1.

That is, in the start-up control section S1, the operating frequency of the compressor 10 is controlled by the start-up control unit 24, but the bumpless control unit 28 calculates the accumulated control increment Hz_sum on the assumption of an on-time control.

The accumulated control increment Hz_sum is a value calculated on the assumption that the compressor is controlled through a normal control. As the compressor is controlled according to an indoor load in the normal control, the compressor 10 is operated at a low frequency in response to a small indoor load, whereas the compressor 10 is operated at a high frequency in response to a great indoor load.

The accumulated control increment Hz_sum is a value obtained through simulation performed on the assumption of normal control.

In the step S40, the bumpless application timing may be determined to be the case where "accumulated control increment(Hz_sum)>=compressor frequency (Hz_init) of at switching timing" or the case where the normal control unit 26 has "control increment (Hz_del)<=0".

The compressor frequency (Hz_init) at the switching timing is the operating frequency of the compressor 10 currently being in operation through a start-up control.

If the accumulated control increment calculated by the bumpless control unit 28 is equal to or greater than the compressor frequency (Hz_init), a bumpless application timing may be determined.

For example, in the case where the compressor frequency (Hz_init) of a compressor being operated through a start-up control is 70 Hz and the accumulated control increment (Hz_sum) is 80 Hz, a bumpless application timing may be determined.

In addition, in the case where the control increment (Hz_del) is equal to or smaller than "0", a bumpless application timing may be determined.

The control increment (Hz_deal) is a value for increasing or decreasing the operating frequency of the compressor 10 when the normal control unit 26 controls the compressor according to an indoor load.

In the case where the control increment (Hz_del) is (+), the operating frequency of the compressor is increased.

This case is the case where there is an indoor load in accordance with a target room temperature.

In the case where the control increment (Hz_del) is (−), the operating frequency of the compressor is decreased.

This case is the case where an indoor load of the target room temperature does not exists or is decreased.

In the case where the control increment (Hz_del) is equal to or smaller than "0", it indicates the control increment (Hz_del) is not increased any longer, which indicates that temperature has reaches to the target room temperature or that an indoor load is decreased.

That is, when the indoor load is "0" or is decreased, a bumpless application timing may be determined.

In the step S50, the compensation value is a step-down value for the operating frequency (Hz) of the compressor 10.

The compensation value is calculated by the bumpless control unit 28.

The compensation value is a value indicative of a degree to which the operating frequency of the compressor needs to be lowered. For example, if there is a great indoor load, the compensation value may be "0" and the operating frequency of the compressor may not be changed. In contrary, if there is a small or no indoor load, the compensation value may be determined differently depending on a difference.

The compensation value may be determined to be a difference between an accumulated control increment Hz_sum of the compressor 10 and a frequency Hz_init of the compressor 10 at a switching timing when the compressor 10 is controlled by the normal control unit 26 in the start-up control section S1.

Compensation Value(Hz)=(Hz_init)−(Hz_sum)

For example, in the case where a compressor frequency (Hz_init) at the switching timing is 70 Hz and an accumulated control increment Hz_sum calculated by the bumpless control unit 28 is 60 Hz, the compensation value may be determined to be 10 Hz.

The accumulated control increment Hz_sum is a value obtained through simulation performed on the assumption of a normal control.

The accumulated control increment Hz_sum is a value accumulated and calculated according to change in an indoor load.

Thus, the compensation value may be described as below.

The frequency Hz_init of the compressor actually being operated through a start-up control is 70 Hz, but a compressor frequency by the accumulated control increment Hz_sum, which assumes that the compressor 10 is controlled through a normal control, may be lower than the frequency Hz_init.

In this case, it may be determined that there is room to lower the operating frequency of the compressor by a difference between the frequency Hz_init of the compressor and the accumulated control increment Hz_sum.

The compensation value indicates room for lowering an operating frequency compared to an indoor load.

If the operating frequency has no gap with the indoor load, the compensation value may be calculated as "0".

Thus, the compensation value may be calculated in various manners according to an indoor load.

In the step S60, the compensation value calculated in the step S50 is applied to the compressor.

The compensation value may be applied after completion of the start-up control.

The compensation value may be applied before beginning of the normal control.

In the case where the normal control unit 26 applies the compensation value to the compressor 10, the step S60 may be regarded as part of a normal control.

After a compensation value is applied to the compressor 10 by the bumpless control, the normal control is performed by the normal control unit 26.

As in this embodiment, if a compensation value is not applied by the bumpless control, the compressor may be frequently turned on and off.

For example, if a start-up control is performed without applying a compensation value by a bumpless control when an indoor load is small, a room temperature may be excessively lowered than a target room temperature.

In this case, as the room temperature is lowered than the target room temperature, the compressor is turned off immediately after the start-up control. Then, if the room temperature is increased again and therefore the compressor is operated, a process of performing the start-up control again and lowering the room temperature than the target room temperature is repeated. That is, if an indoor load is small, only a start-up control may repeatedly performed without being transferred to an on-time control.

The control method according to this embodiment is able to actively determine a bumpless application timing, and thus, it is possible to actively reduce the start-up control section S1.

As a result, even in the case where an indoor load is small, it is possible to transfer the control right to an on-time control, without a need for turning off the compressor, after a compensation value is applied by a bumpless control after the start-up control.

After the step S60, the main control unit 22 switches the control right over the compressor 10.

Meanwhile, in the case where the switching condition is not satisfied in the step S30, it returns back to the step S20.

With reference to FIGS. 5 to 8, change in the air conditioner through a bumpless control will be described.

Figure 5A:
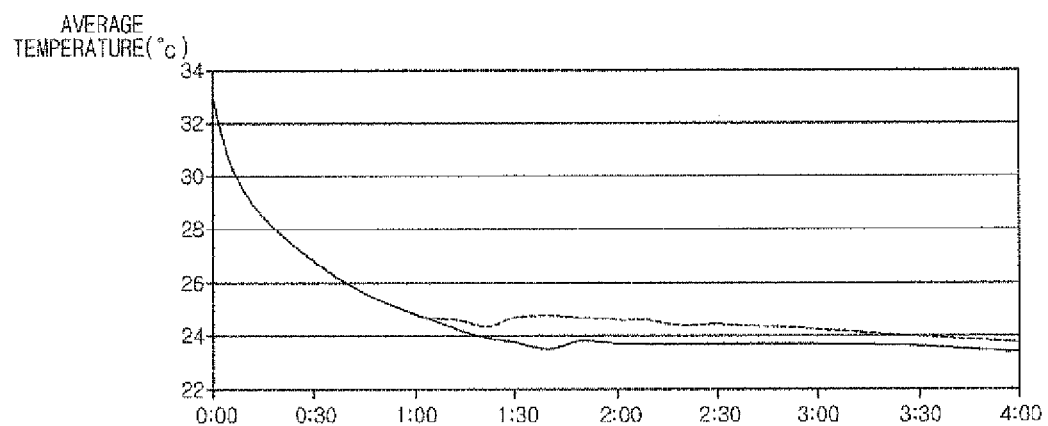
FIG. 5. A is a graph illustrating change in room temperature according to conventional control and bumpless control after the initial start-up of the compressor.
FIG. 5B is a graph illustrating change in operating frequency according to the conventional control and bumpless control after the initial start-up of the compressor.
Figure 5B:
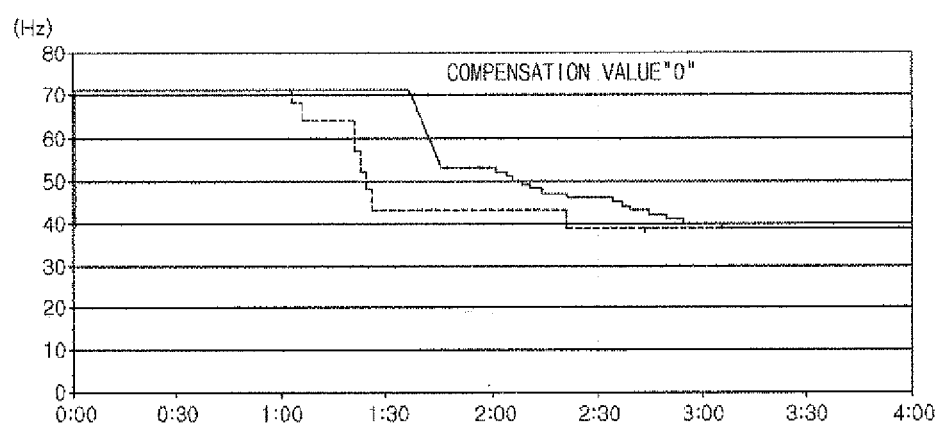

FIG. 5(A) is a graph showing change in a room temperature, and FIG. 5(B) is a graph showing an operating frequency of the compressor.

A solid line is a graph in which a bumpless control is applied according to this embodiment.

A dotted line is a graph in which a bumpless control is not applied as in an existing technology.

As illustrated in FIG. 5(A), it is found that the control method according to an embodiment of the present invention makes a room temperature closer to a target room temperature, compared to the existing technology.

As illustrated in FIG. 5(B), it is found that the control method according to an embodiment of the present invention controls the compressor at an operating frequency, such as a start-up control, for a time period longer than that of the existing technology.

That is, an indoor load is great in FIG. 5(B), and thus, a compensation value of "0" is applied and the start-up control is switched into a normal control without causing in the frequency of the compressor 10 to change.

Figure 6A:
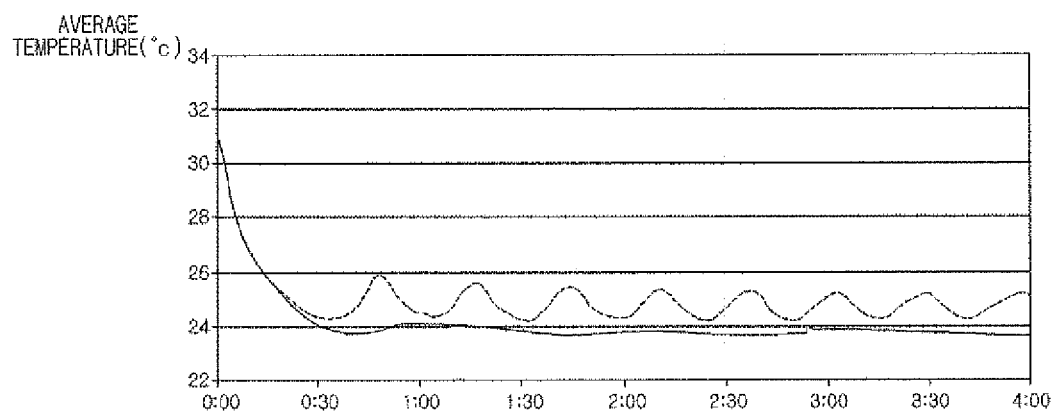
FIG. 6A is a graph illustrating change in room temperature according to the conventional control and bumpless control after the initial start-up of the compressor, when the indoor load is smaller than that of FIG. 5A.

Room temperature in the graph of FIG. 6(A) is lower than in FIG. 5(A), and therefore, an indoor load in the graph of FIG. 6(A) is small.

Figure 6B:
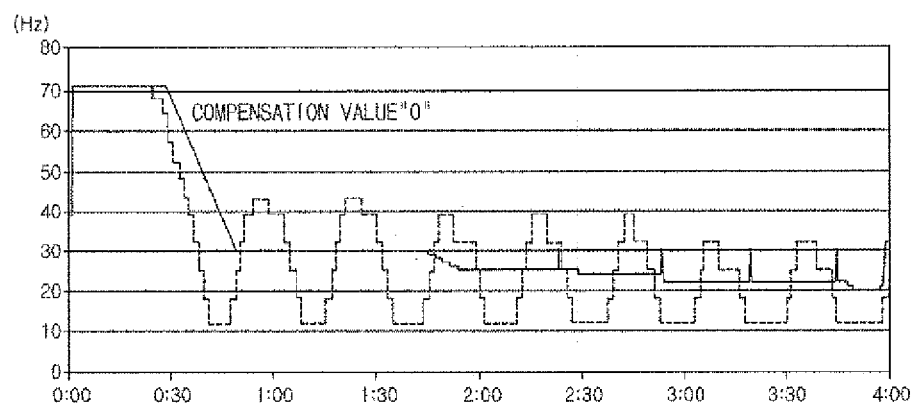
FIG. 6B is a graph illustrating change operating a frequency according to the conventional control and bumpless control after the initial start-up of the compressor, when the indoor load is smaller than that of FIG. 5B.

As shown in the graph of FIG. 6(B), the operating frequency of the compressor is not stepped down even in FIG. 6(B) by a compensation value after a start-up control, and thus, the compensation value is "0".

FIG. 7 is a situation in which an indoor load is smaller than that of FIG. 6.

Figure 7A:
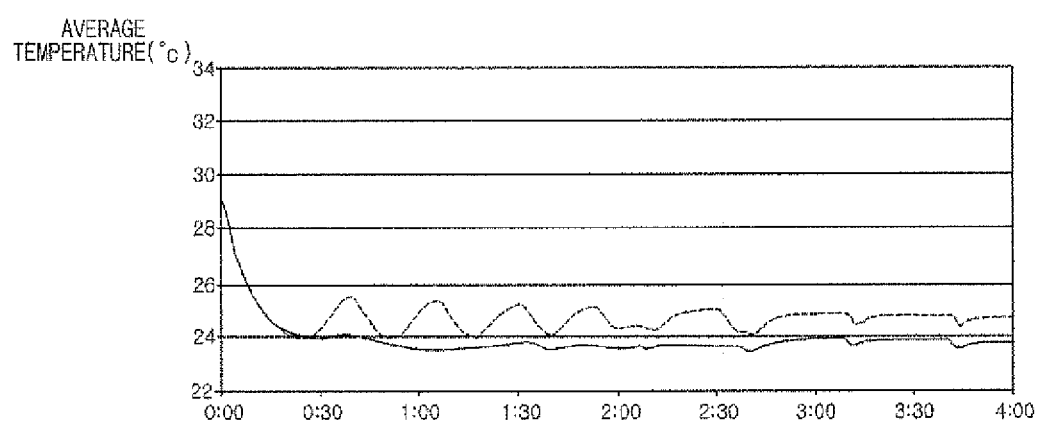
FIG. 7A is a graph illustrating change in room temperature according to the conventional control and bumpless control after the initial start-up of the compressor, when the indoor load is smaller than that of FIG. 6A.
Figure 7B:
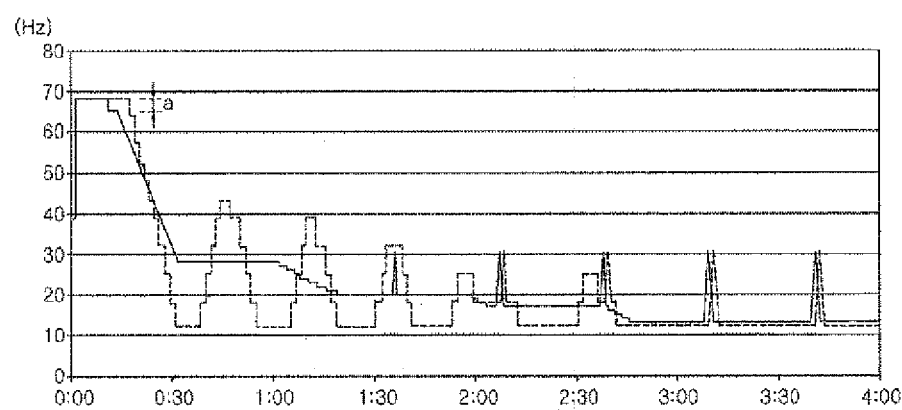
FIG. 7B is a graph illustrating change in operating frequency according to the conventional control and bumpless control after the initial start-up of the compressor, when the indoor load is smaller than that of FIG. 6B.

As shown in the graph of FIG. 7(B), a compressor frequency is stepped down in FIG. 7(B) by a compensation value (a) after a start-up control.

In addition, a start-up control section in FIG. 7(B) is shorter than those in FIGS. 5(B) and 6(B). That is, due to a small indoor load, a timing of applying a bumpless control is advanced earlier than in FIGS. 5(B) and 6(B).

As shown in FIG. 6(B) or 7(B), the control method according to this embodiment may form a more gentle slope of the operating frequency of the compressor than the existing technology.

In this embodiment, the compensation value is applied in response to a small indoor load, so a gentle slope of operating frequency may be formed. However, in the graph according to the existing technology, a compensation value by a bumpless control in accordance with the indoor load is not taken into consideration, so a steep slope of operating frequency needs to be formed to lower a room temperature.

If room temperature is lowered drastically as in the existing technology, oscillation of a room temperature graph occurs, as shown in FIG. 6(A) or FIG. 7(A).

It is a phenomenon occurring when the operating frequency of a compressor is lowered or increased drastically.

The bumpless control according to this embodiment may prevent occurrence of the oscillation.

Figure 8A:
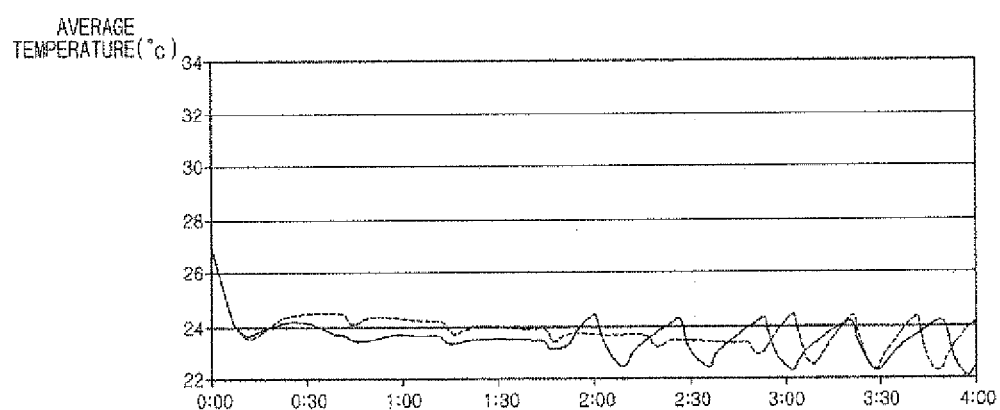
FIG. 8A is a graph illustrating change room temperature according to the conventional control and bumpless control after the in initial start-up of the compressor, when the indoor load is smaller than that of FIG. 7A.

FIG. 8 shows a situation in which an indoor load is smaller than in FIG. 7.

Figure 8B:
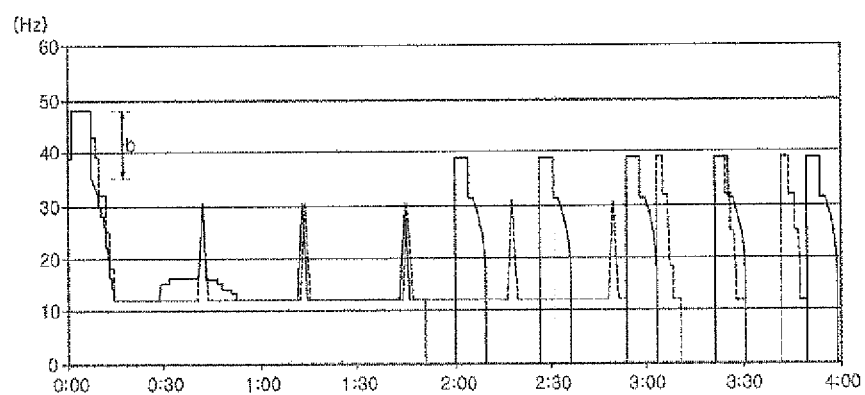
FIG. 8B is a graph illustrating change in operating frequency according to the conventional control and bumpless control after the initial start-up of the compressor, when the indoor load is smaller than that of FIG. 7B.

As shown in the graph of FIG. 8(B), a compressor frequency is stepped down by a compensation value (B) after a start-up control.

Because the indoor load is smaller than in FIG. 7, the size of the compensation value (B) is greater than the size of the compensation value (A).

In addition, because the indoor load is smaller, a timing of applying the bumpless control is advanced earlier than in FIG. 7(B).

As such, the control method of an air conditioner according to the present invention may actively determine an application timing at which a start-up control is switched into an on-time control through a bumpless control.

The control method of an air conditioner according to the present invention may apply a compensation value through a bumpless control in accordance with an indoor load when a start-up control is switched to an on-time control, thereby achieving energy saving.

The control method of an air conditioner according to the present invention may quickly apply a compensation value for an indoor load when a start-up control is switched into an on-time control through a bumpless control, thereby preventing a compressor from being turned off.

Although some embodiments have been described with reference to the accompanying drawings, the present invention may be embodied in many different ways and should not be construed as being limited to the embodiments set forth herein. It will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be construed in any way as limiting the present invention.

The invention claimed is:

1. An air conditioner, comprising:
   a compressor configured to compress a refrigerant; and
   a control unit configured to control the compressor, wherein the control unit comprises:
      a main control unit configured to control an entire air conditioner;
      a start-up control unit configured to control the compressor at an initial start-up as power is applied to the compressor;
      a normal control unit configured to control the compressor according to a room temperature sensing unit after controlling by the start-up control unit is completed; and
      a bumpless control unit configured to, when a control right over the compressor is transferred from the start-up control unit to the normal control unit, apply a compensation value, which is a stepped down operating frequency of the compressor, according to an indoor load, wherein the start-up control unit operates the compressor at a maximum frequency regardless of the indoor load during the initial start-up of the compressor, wherein the normal control unit operates the compressor according to the indoor load after the initial start-up of the compressor, wherein the bumpless control unit applies the compensation value to the maximum frequency when the control right over the compressor is transferred from the start-up control unit to the normal control unit;
   wherein the compensation value is applied to the operating frequency of the compressor, when the control right over the compressor is transferred, at a time when either:
      an accumulated control increment (Hz_sum) of the compressor, which is calculated when a normal control is performed on the compressor according to the indoor load, is equal to or greater than the maximum frequency (Hz_init) of the compressor; or
      a control increment (Hz_Del) which increases or decreases an operating frequency of the compressor when a normal control is performed on the compressor according to the indoor load is 0 or negative when the control right over the compressor is transferred.

2. A method for controlling an air conditioner, the air conditioner comprising a compressor configured to compress a refrigerant, and a control unit configured to control the compressor, the control unit comprising a main control unit configured to control an entire air conditioner, a start-up control unit configured to control the compressor at an initial start-up as power is applied to the compressor, a normal control unit configured to control the compressor according to a room temperature sensing unit after controlling by the start-up control unit is completed, and a bumpless control unit configured to, when a control right over the compressor is transferred from the start-up control unit to the normal control unit, calculate a compensation value which lowers an operating frequency of the compressor according to an indoor load, the method comprising:

operating the compressor, via the start-up control unit, at a maximum frequency regardless of the indoor load during the initial start-up of the compressor;

operating the compressor, via the normal control unit, according to the indoor load;

calculating, via the bumpless control unit, the compensation value, wherein the start-up control unit operates the compressor at the maximum frequency regardless of the indoor load;

holding the compensation value until the control right over the compressor is transferred from the start-up control unit to the normal control unit, wherein the bumpless control unit steps down the maximum frequency of the compressor according to the compensation value when the control right over the compressor is transferred from the start-up control unit to the normal control unit; and wherein the compensation value is applied to the operating frequency of the compressor, when the control right over the compressor is transferred, at a time when either:

an accumulated control increment ($Hz\_sum$) of the compressor, which is calculated when a normal control is performed on the compressor according to the indoor load, is equal to or greater than the maximum frequency ($Hz\_init$) of the compressor; or a control increment ($Hz\_Del$) which increases or decreases an operating frequency of the compressor when a normal control is performed on the compressor according to the indoor load is 0 or negative when the control right over the compressor is transferred.

3. The method of claim 2, wherein the compensation value is a difference between a frequency ($Hz\_init$) of the compressor at a switching timing and an accumulated control increment ($Hz\_sum$) of the compressor calculated when a normal control is performed on the compressor according to the indoor load.

4. The method of claim 2, further comprising: initially starting up the compressor as power is applied to the compressor;

performing via the start-up control unit, a start-up control on the compressor upon the initial start of the compressor;

determining a switching condition for switching the control right over the compressor after the performing of the start-up control;

determining the time when the compensation value is applied to the operating frequency of the compressor, when the switching condition is satisfied in the step of determining the switching condition;

determining a size of the compensation value when the switching condition is satisfied in the step of determining of the switching condition;

applying the compensation value to the compressor at the time determined in the step of determining the time when the compensation value is applied to the operating frequency of the compressor; and switching, via the main control unit, the control right to the normal control unit.

5. The method of claim 4, wherein the switching condition is set with respect to a target room temperature.

6. The method of claim 4, wherein the switching condition is set with respect to an operating time of the compressor.

7. The method of claim 4, wherein the switching condition is set as a predetermined ratio of a difference between a target room temperature and a room temperature.

8. The method of claim 4, wherein the compensation value in the determining of the size of the compensation value is a difference between a frequency ($Hz\_init$) of the compressor at a switching timing and an accumulated control increment ($Hz\_sum$) of the compressor, which is calculated when a normal control is performed on the compressor according to an indoor load.

* * * * *